United States Patent
Yen

(10) Patent No.: US 8,514,271 B2
(45) Date of Patent: *Aug. 20, 2013

(54) STEREOSCOPIC CAMERA MODULE AND ELECTRONIC DEVICE USING THE SAME

(75) Inventor: Shih-Chieh Yen, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 308 days.

This patent is subject to a terminal disclaimer.

(21) Appl. No.: 12/900,461

(22) Filed: Oct. 7, 2010

(65) Prior Publication Data

US 2012/0038749 A1  Feb. 16, 2012

(30) Foreign Application Priority Data

Aug. 12, 2010  (TW) ................................ 99126847 A

(51) Int. Cl.
*H04N 13/02* (2006.01)

(52) U.S. Cl.
USPC ............................................. 348/49; 348/42

(58) Field of Classification Search
None
See application file for complete search history.

(56) References Cited

U.S. PATENT DOCUMENTS

| | | | |
|---|---|---|---|
| 7,777,970 B2* | 8/2010 | Liang | 359/737 |
| 2003/0174237 A1* | 9/2003 | Lee | 348/363 |
| 2008/0239064 A1* | 10/2008 | Iwasaki | 348/47 |

* cited by examiner

*Primary Examiner* — Mehrdad Dastouri
*Assistant Examiner* — James Anderson, II
(74) *Attorney, Agent, or Firm* — Altis Law Group, Inc.

(57) ABSTRACT

A stereoscopic camera module includes two lens modules, a light guide assembly, an image sensor, and a processor. Each lens module includes a shutter and at least one lens. The light guide assembly includes two inlets and an outlet, the two inlets are hermetically sealed by the two lens modules. External light rays enter into the two inlets from the two lens modules respectively and project from the outlet. The image sensor is position at the outlet of the light guide assembly and configured for capturing images. The processor is configured for controlling the shutters to open in quick succession and composing a left image and a right image alternately captured by the image sensor to a stereoscopic image.

10 Claims, 5 Drawing Sheets

STEREOSCOPIC CAMERA MODULE AND ELECTRONIC DEVICE USING THE SAME

CROSS-REFERENCE STATEMENT

This application is related to a co-pending U.S. patent application Ser. No. 12/894,094, entitled "STEREOSCOPIC IMAGING DEVICE", invented by Shih-Chieh Yen. Such application has the same inventor and assignee as the present application.

BACKGROUND

1. Technical Field

The present disclosure relates to camera modules and, particularly, to a stereoscopic camera module capable of capturing a stereoscopic image.

2. Description of Related Art

Current stereoscopic camera modules include two lens modules, two image sensors corresponding to the lens modules, and a processor. In use, the two lens modules have camera angles similar to two human eyes and the resulting parallax effect is exploited by two image sensors capturing a left image and a right image. The processor receives the two images composes a stereoscopic image. Although effective, the need for separate lens modules and image sensors is costly and the camera is not compact.

Therefore, it is desirable to provide a stereoscopic camera module and an electronic device using the same which can overcome the limitations described above.

DETAILED DESCRIPTION

Embodiments of the disclosure will now be described in detail, with reference to the accompanying drawings.

Figure 1:
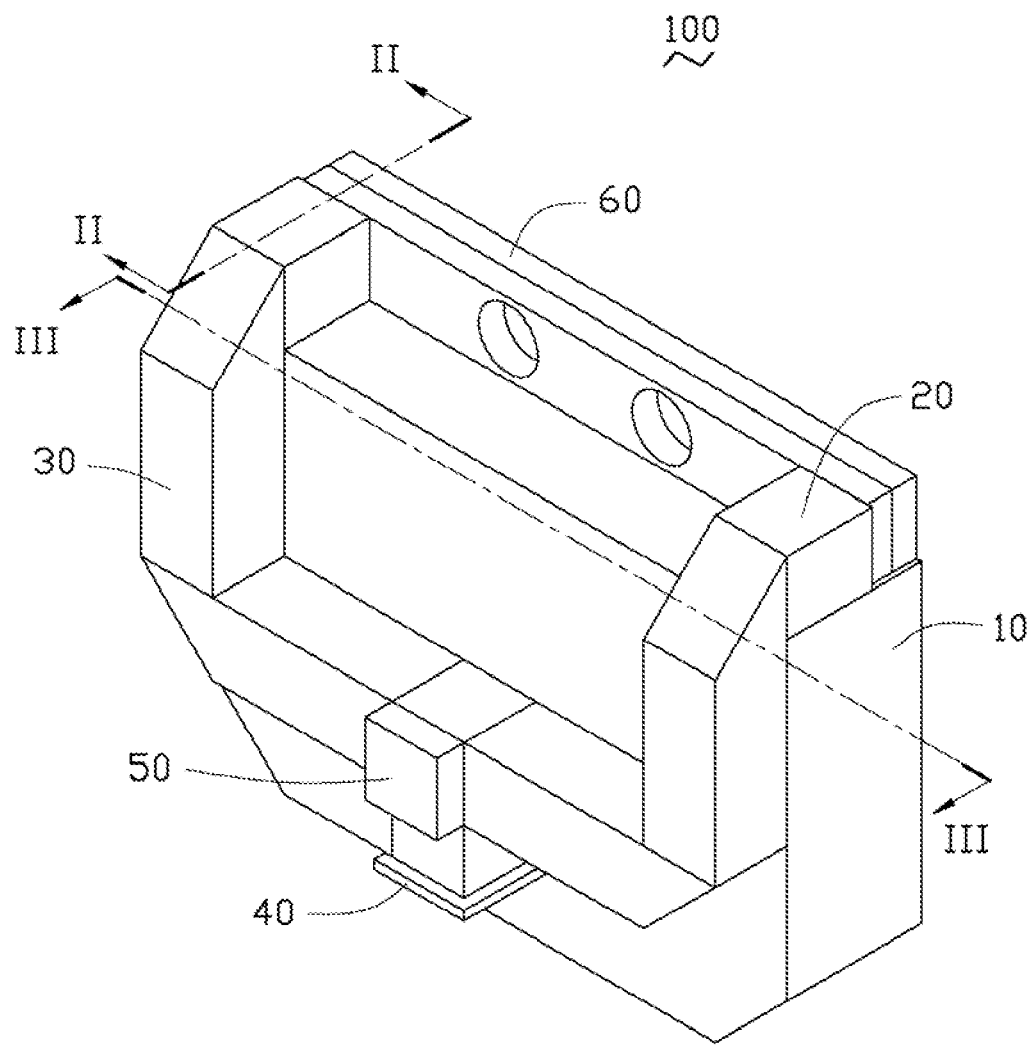
FIG. 1 is a schematic, isometric view of a stereoscopic camera module in accordance with an exemplary embodiment.
Figure 2:
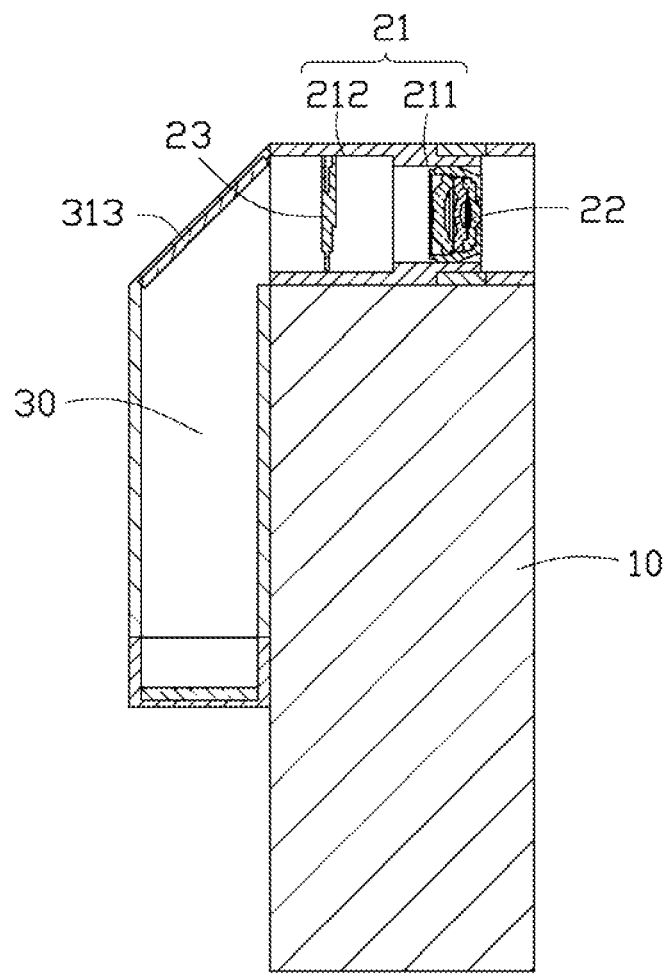
FIG. 2 is a cross-sectional view of the stereoscopic camera module, taken along a line II-II of FIG. 1.
Figure 3:
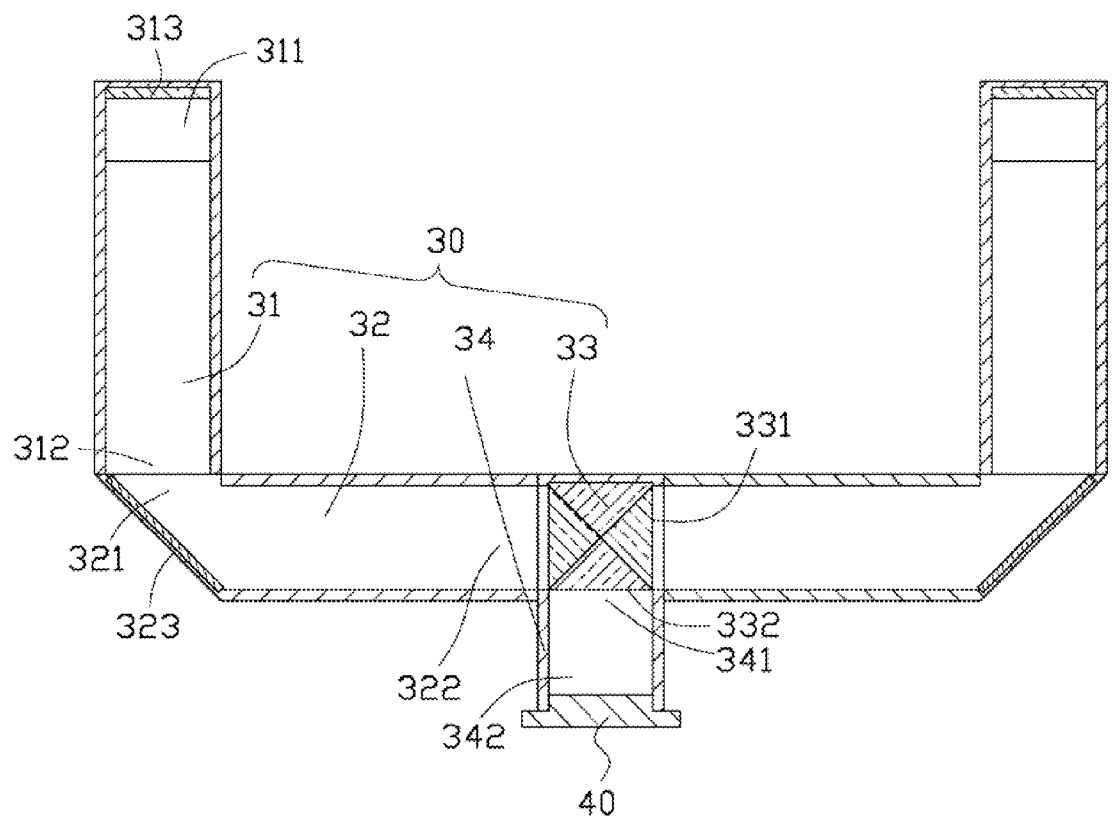
FIG. 3 is similar to FIG. 2, taken along a line of FIG. 1.

Referring to FIGS. 1-3, a stereoscopic camera module 100 in accordance with an exemplary embodiment is shown. The stereoscopic camera module 100 includes a base 10, two lens modules 20, a light guide assembly 30, an image sensor 40, a processor 50, and a fixing plate 60.

Figure 4:
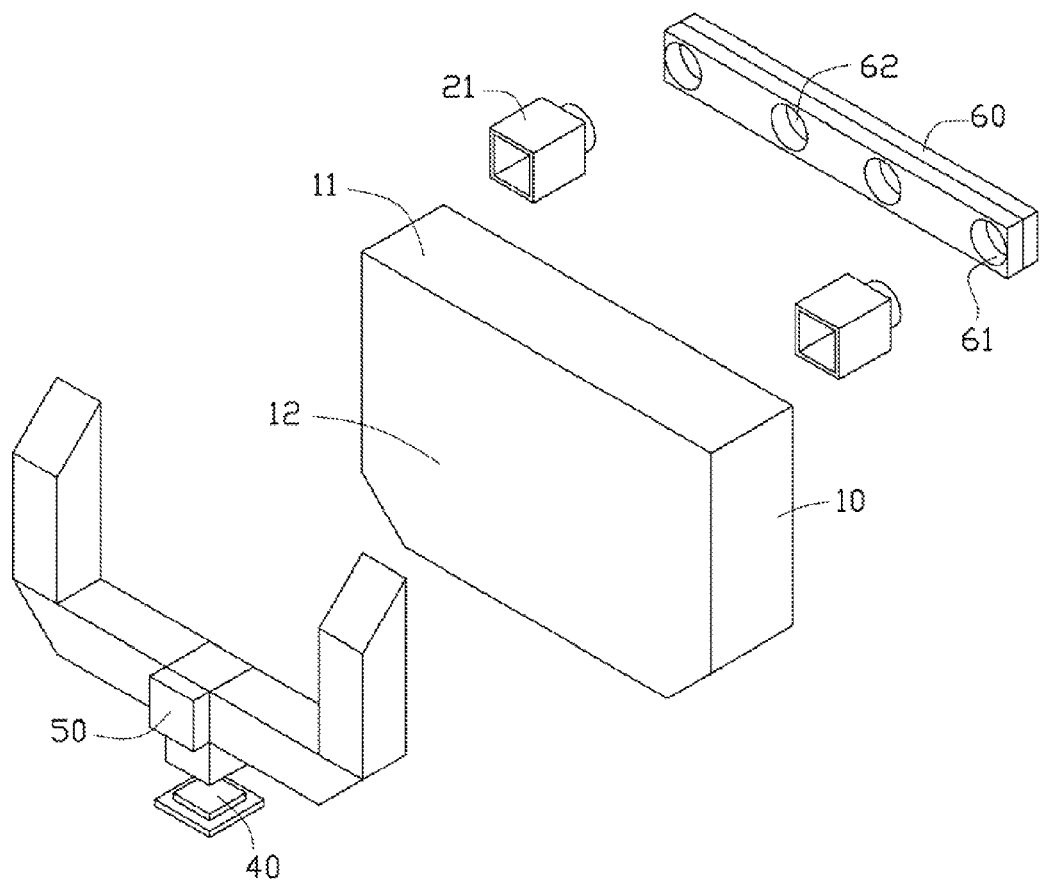
FIG. 4 is an isometric, exploded view of the stereoscopic camera module of FIG. 1.

Further referring to FIG. 4, the base 10 is a rectangular plate and is made of plastic material. The base 10 includes an upper surface 11 and a side surface 12 substantially perpendicular to the upper surface 11.

The two lens modules 20 are disposed on two ends of the upper surface 11 so that they can both be focused on a same object and capture two images of the object from different points that are not on a line with the object. One lens module 20 is configured for capturing an image from a left viewpoint called left image herein, and the other lens module 20 is configured for capturing an image from a right viewpoint called right image herein. Each of the lens modules 20 includes a lens barrel 21, at least one lens 22, and a shutter 23. The lens barrel 21 includes a front end 211 (i.e., the object-side end) and a rear end 212 (i.e., the image-side end), and the external diameter of the rear end 212 is greater than the external diameter of the front end 211. The at least one lens 22 is received in the front end 211, and the shutter 23 is received in the rear end 212. In this embodiment, the shutter 23 is an electrical shutter.

The light guide assembly 30 is disposed on the side surface 12, and includes two first light guiding pipes 31, two second light guiding pipes 32, a prism 33, and a third light guiding pipe 34. The two first light guiding pipes 31 are arranged perpendicular to the upper surface 11, and each first light guiding pipe 31 includes a first inlet 311 and a first outlet 312. The first inlet 311 forms a hermetic seal with the corresponding rear end 212, and a first mirror 313 is disposed at the first inlet 311 at a 45 degree angle with respect to the first inlet 311 to reflect light rays from the rear end 212 into the corresponding first light guiding pipe 31. The second light guiding pipes 32 perpendicularly connect to the first light guiding pipes 31 and each of the second light guiding pipes 32 includes a second inlet 321 and a second outlet 322. The second inlet 321 forms a hermetic seal with the first outlet 312, and a second mirror 323 is disposed at the second inlet 321 at a 45 degree angle with respect to the second inlet 321 to reflect light rays from the first outlet 312 into the second light guiding pipe 32. The prism 33 is an X-cube, and includes two opposite incidence faces 331 and an emitting face 332. The prism 33 is disposed between and interconnects the two second light guiding pipes 32, and the two opposite incident faces 331 seal the two second outlets 322. The third light guiding pipe 34 perpendicularly connects with the second light guiding pipes 32 and includes a third inlet 341 and a third outlet 342. The third inlet 341 is sealed by the emitting face 332. A face of the prism 33 opposite to the emitting face 332 is covered with an opaque film. In this embodiment, the first light guiding pipes 31 and the third light guiding pipe 34 are respectively positioned on the two sides of the second light guiding pipes 32. The first light guiding pipe 31 and the second light guiding pipe 32 are integrally formed as one piece.

The image sensor 40 is disposed on the third outlet 342 of the third light guiding pipe 34. The image sensor 40 receives light rays passing through the light guide assembly 30 and converts the light to electronic signals. In this embodiment, the image sensor 40 can be a charge coupled device (CCD) or a complementary metal oxide semiconductor (CMOS).

The processor 50 is a control chip and disposed on a side face of the prism 33 opposite to the other side face adjacent to the side surface 12 of the base 10. The processor 50 is electrically connected to the two shutters 23 of the lens module 20 and the image sensor 40. The processor 50 opens or closes the two shutters 23 alternately. In this embodiment, the processor 50 is an application specific integrated circuit (ASIC).

The fixing plate 60 is a strip plate, and defines two first holes 61 and two second holes 62 thereon. The two first holes 61 are adjacent to the two end of the fixing plate 60, and the two second holes 62 are positioned between the two first holes 61. The fixing plate 60 is perpendicularly disposed at the edge of the upper surface 11. The front end 211 of the lens barrel 21 is sleeved in the first hole 61. Two flash lamps (not shown) are received in the second holes 62 respectively.

In operation, the processor 50 opens the shutters 23 in quick succession. Thus, the lens modules 20 alternately form an optical image on the image sensor 40. That is, in this embodiment, the shutter 23 in the left lens module 21 is opened exposing the image sensor 40 and a corresponding image is sent to the processor 50. Then the shutter 23 in the right lens module 20 is opened exposing the image sensor 40 and a corresponding image is sent to the processor 50. Then, the processor 50 combines the two images to form a stereoscopic image, and the stereoscopic image is output to a display screen (not shown).

Figure 5:
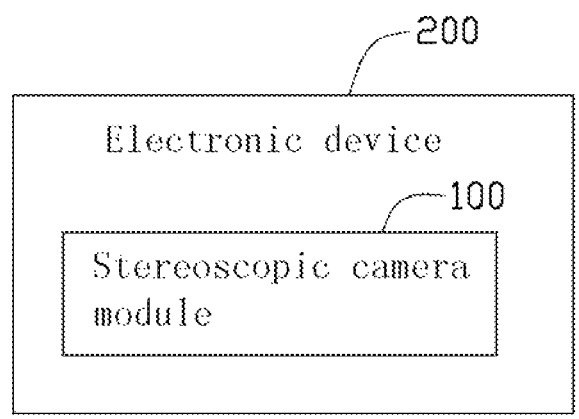
FIG. 5 is a schematic view of an electronic device using the stereoscopic camera module of FIG. 1.

Referring to FIG. 5, an electronic device 200 includes the stereoscopic camera module 100. The electronic device 200 may be a camera, a mobile phone, and a computer and not detailed herein as they are well know in the art.

It will be understood that particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A stereoscopic camera module, comprising:
two lens modules, each of the lens modules comprising a shutter and at least one lens;
a light guide assembly comprising two inlets and an outlet, the two inlets sealed by the two lens modules; the light guide assembly comprising two first light guiding pipes, two second light guiding pipes, a prism, and a third light guiding pipe;
wherein the two second light guiding pipes perpendicularly connect with the two first light guiding pipes respectively, the prism is positioned between the two second light guiding pipes, the third light guiding pipe is perpendicular to the second light guiding pipes and parallel with the first light guiding pipes, the third light guiding pipe connects with the prism, the two lens modules are perpendicular to a plane formed by the first light guiding pipes and the second light guiding pipes, each of the first light guiding pipes comprises a respective one of the inlets of the light guide assembly, and the third light guiding pipe comprises the outlet of the light guide assembly;
an image sensor positioned at the outlet of the light guide assembly and configured for capturing a left image and a right image; and
a processor in communication with the shutters of the two lens modules and configured for controlling the shutters to open in quick succession, the processor in communication with the image sensor and configured for composing the left image and the right image captured by the image sensor to a stereoscopic image.

2. The stereoscopic camera module in claim 1, wherein the lens module further comprises a lens barrel, the lens barrel comprises a front end and a rear end, the at least one lens is received in the front end, and the shutter is received in the rear end.

3. The stereoscopic camera module in claim 1, wherein each of the first light guiding pipes comprises a first inlet and a first outlet, the first inlet hermetically seals with the rear end, a first mirror is positioned at the first inlet at a 45 degree angle with respect to the first inlet to reflect light rays from the rear end into the corresponding first light guiding pipe, and the first inlets of the two first light guiding pipes are the inlets of the light guide assembly.

4. The stereoscopic camera module in claim 3, wherein each of the second light guiding pipes comprises a second inlet and a second outlet, the second inlet hermetically seals with the first outlet, and a second mirror is positioned at the second inlet at a 45 degree angle with respect to the second inlet to reflect light rays from the first outlet into the second light guiding pipe.

5. The stereoscopic camera module in claim 4, wherein the prism is an X-cube, and comprises two opposite incidence faces and an emitting face, the prism is positioned between the two second light guiding pipes, and the two opposite incidence faces seal the second outlets of the two second light guiding pipes.

6. The stereoscopic camera module in claim 5, wherein the third light guiding pipe comprises a third inlet and a third outlet, the third inlet is hermetically seals by the emitting face, the third outlet of the third light guiding pipe is the outlet of the light guide assembly.

7. The stereoscopic camera module in claim 6, wherein the image sensor is positioned on the third outlet of the third light guiding pipe.

8. The stereoscopic camera module in claim 1, further comprising a base, wherein the base comprises an upper surface and a side surface perpendicular to the upper surface, the two lens modules are positioned on two ends of the upper surface, and the light guide assembly is positioned on the side surface.

9. An electronic device, comprising:
a stereoscopic camera module, comprising:
two lens modules, each of the lens modules comprising a shutter and at least one lens;
a light guide assembly comprising two inlets and an outlet, the two inlets sealed by the two lens modules; the light guide assembly comprising two first light guiding pipes, two second light guiding pipes, a prism, and a third light guiding pipe;
wherein the two second light guiding pipes perpendicularly connect with the two first light guiding pipes respectively, the prism is positioned between the two second light guiding pipes, the third light guiding pipe is perpendicular to the second light guiding pipes and parallel with the first light guiding pipes, the third light guiding pipe connects with the prism, the two lens modules are perpendicular to a plane formed by the first light guiding pipes and the second light guiding pipes, each of the first light guiding pipes comprises a respective one of the inlets of the light guide assembly, and the third light guiding pipe comprises the outlet of the light guide assembly;
an image sensor positioned at the outlet of the light guide assembly and configured for capturing a left image and a right image; and
a processor in communication with the shutters of the two lens modules and configured for controlling the shutters to open in quick succession, the processor in communication with the image sensor and configured for composing the left image and the right image captured by the image sensor to a stereoscopic image.

10. The stereoscopic camera module in claim 2, wherein the lens barrel is perpendicular to the plane formed by the first light guiding pipes and the second light guiding pipes.

* * * * *